United States Patent Office 3,664,702
Patented May 23, 1972

3,664,702
RELEASE MECHANISM
Eric Ambrose Hyde, Bromley, England, assignor to The British Iron and Steel Research Association
Filed May 21, 1970, Ser. No. 39,472
Claims priority, application Great Britain, May 27, 1969, 26,687/69
Int. Cl. B65c 13/00
U.S. Cl. 294—69                            6 Claims

ABSTRACT OF THE DISCLOSURE

The invention concerns a scrap basket or pre-heater of the petal type. The basket or pre-heater of the invention is characterised in having a member coupled to the underside of the petals by way of link means and being movable towards and away from the body of the basket or pre-heater to effect opening and closing of the petals, and releasable means for holding said member in a position at which the petals will be closed.

---

The present invention is concerned with the design of a scrap basket or pre-heater. A scrap pre-heater or basket may hold the scrap while the scrap is pre-heated prior to entry into the steelmaking vessel which may be an arc furnace for example. After the scrap has been pre-heated, it is discharged into the steelmaking vessel. It is generally accepted that there are two methods of removing or releasing scrap from the basket or pre-heater, one method employing clamshell doors and the other method employing petals. Petals have the advantage that they lie within the diameter of the basket and hence if the basket is of a small enough diameter to be lowered into the steelmaking vessel, the petals will facilitate this and hence will cause less damage to the refractory lining of the steelmaking vessel. Clamsheel doors require that the basket is opened well above the steelmaking vessel and damage to the refractory can occur due to the impact of the scrap. The scrap pre-heater or basket of the present invention is of the type employing petals.

According to the present invention, there is provided a basket for scrap having petals arcuately movable between closed position to retain scrap in the basket and open position to allow scrap to be discharged from the basket, a member coupled to the underside of the petals by way of link means and being movable towards and away from the body of the basket to cause movement of the petals towards their closed and open positions, and releasable means for holding said member in a position at which the petals will be in their closed position.

The present invention will be more readily understood from the following description, given by way of example only, reference being made to the accompanying drawings in which.

Figure 1:
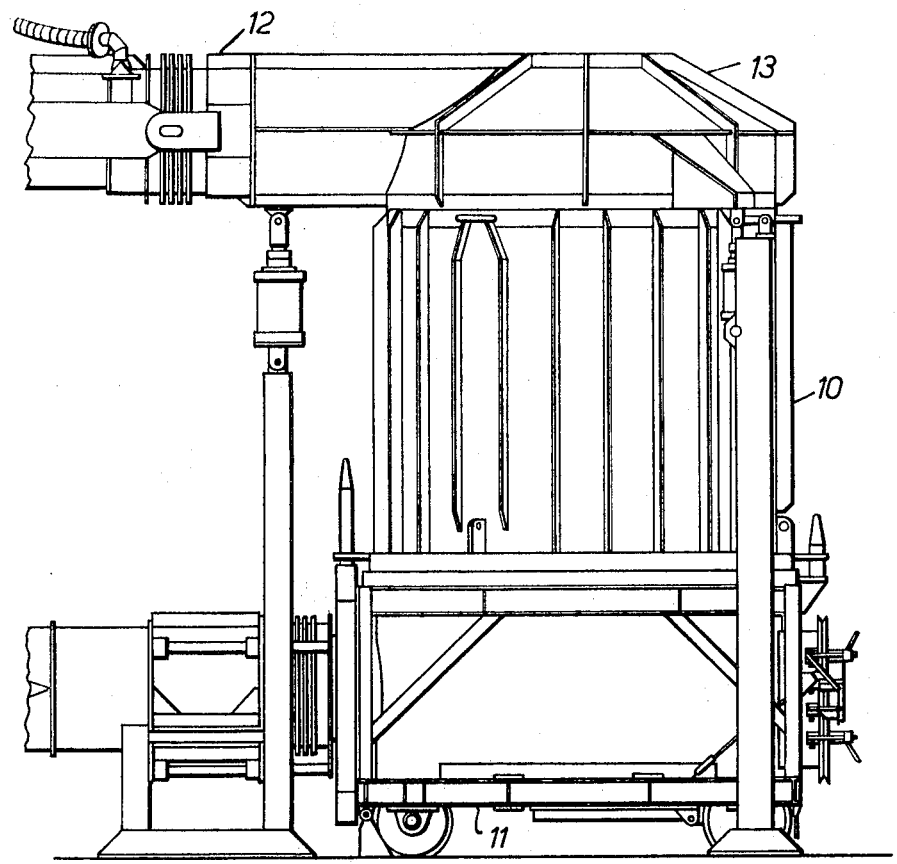
FIG. 1 shows a scrap basket or pre-heater according to the invention incorporated in a scrap preheating plant.

Turning to FIG. 1, the scrap pre-heater or basket of the invention is shown at 10 carried on a bogie 11. Hot pre-heat gases are fed to the pre-heater 10 to pre-heat scrap present therein by way of an articulated duct 12 coupled to a hood 13 mounted on the top of the pre-heater.

Figure 2:
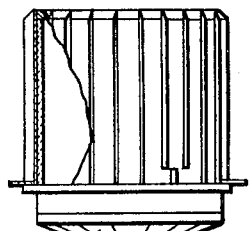
FIG. 2 is a part-sectional view showing refractory lining of a scrap pre-heater of the petal type but with means, not according to the invention, whereby the petals can be held in, and released from, their closed position.
Figure 3:
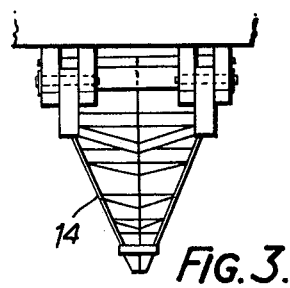
FIG. 3 is a detail of the petal door hinges of the pre-heater of FIG. 2.
Figure 4:
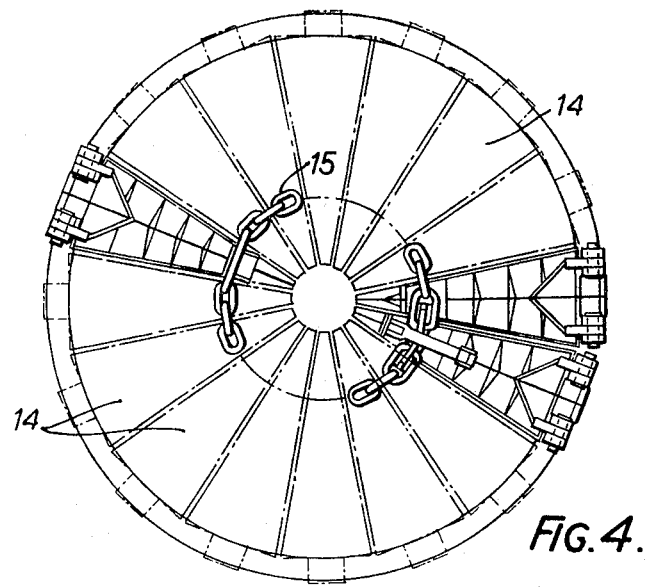
FIG. 4 is a view in the direction of arrow A of FIG. 2.

In the scrap pre-heater of FIGS. 2 to 4, the petals (some of which are shown at 14) are held together in closed position during the heating of scrap in the pre-heater by a pin mechanism holding a chain 15. The pin mechanism is released when the pre-heated scrap is positioned over the steelmaking vessel to discharge the pre-heated scrap. After the steelmaking vessel has been charged, the petals have to be closed and the chain made up before scrap can be charged into the pre-heater prior to pre-heating. This practice is sufficiently tedious to make the design of a pre-heater with petals thus fixed untenable.

Figure 5A:
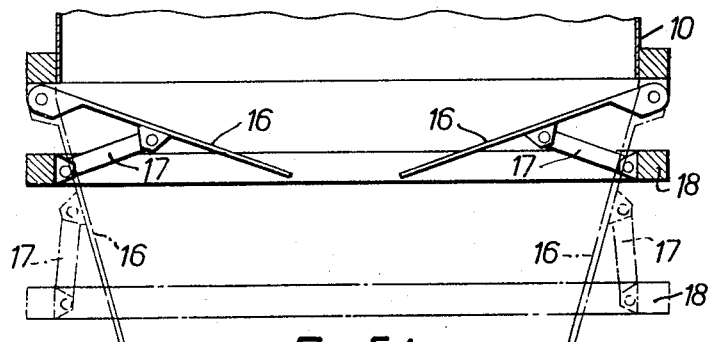
FIGS. 5A and 5B illustrate a scrap basket or pre-heater according to the present invention incorporating an automatic petal release mechanism.
Figure 5B:
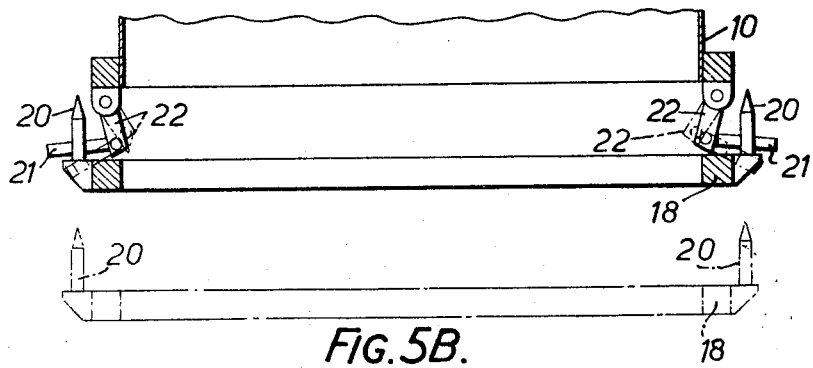

Referring to FIGS. 5A and 5B, there is shown a scrap pre-heater 10 of the petal type, its base comprising a plurality of hinged petals (two of which are shown at 16) movable between closed (full line) position to retain scrap in the pre-heater and open (dotted line) position to allow scrap to be discharged from the pre-heater. A link 17 is hinged to each petal and is connected at its lower end to a hoop 18, this lower joint being pinned. When the pre-heater sits on its hoop, the petals are pushed into closed (full line) position by the link attachments whereby scrap will be retained in the pre-heater. As seen in FIG. 5B, vertical pins 20 are attached to the hoop 18 which is shown in full line in petal closed position and in dotted line in petal open position. The pins 20 are engageable with pivoted locking plates 21 having apertures therethrough to receive the pins, each locking plate being fast with a link 22 which is pivoted on the body of the pre-heater. When the scrap pre-heater is raised (following setting of the pre-heater on its hoop), the locking plates 21 (in full line position) hold the pins and hoop (in full line position) and the petals are kept in closed position.

After the pre-heating cycle, the pre-heater 10 is lowered onto the steelmaking vessel (e.g. arc furnace) shell and the locking plates 21 are moved into the horizontal position by a ring mounted above the steelmaking vessel or by other suitable means. The forces causing such movement of the locking plates act substantially at the outer peripheries of those plates. The pins 20 holding the petals by way of the hoop 18 are thereby released and the pre-heating vessel automatically discharges; the hoop 18, pins 20 and plates 21 will then be in their dotted line positions shown in FIG. 5B. The petals open solely under gravity and without any spring mechanism. To facilitate lowering of the pre-heater 10 onto the steelmaking vessel, the extent of the outer boundary of the hoop 18 substantially equals the extent of the outer boundary of the base of the body of the pre-heater.

In order to repeat the cycle, the pre-heater is lowered onto its hoop 18, the hoop closes on the body of the pre-heater whereby the petals automatically close, the pins 20 enter the apertures in the plates 21 and the petals are thereby locked in closed position on lifting the pre-heater 10.

The basket for scrap according to the invention may or may not have a refractory lining.

I claim:
1. A basket for conveying scrap to a vessel, said basket comprising:
   (a) a body;
   (b) petals mounted beneath the body and arcuately moveable relative to the body between a closed position to retain scrap in the basket and an open position to allow scrap to be discharged from the basket;
   (c) a member adapted to rest on a supporting surface and coupled to said body to permit said member and body to move toward and away from each other, link means coupling said member to the underside of said petals, so that said petals are moved toward their closed position when said body and member approach each other and toward their open position when said body and member move away from each other; and (d) releasable automatic locking means comprising a first part attached to the body and a second part attached to said member, said locking means being automatically operative to interlock said first and second parts when said basket is lowered with said member resting on a supporting surface, thus moving said body and member toward each other and said petals into said closed position, and to hold said petals in their closed position when said basket is subsequently raised.

2. A basket according to claim 1 wherein said releasable means is adapted to be released automatically by contact of one of said parts with a vessel when the basket is lowered onto the vessel.

3. A basket according to claim 1 wherein said member is hoop-like.

4. A basket according to claim 1 wherein the extent of the outer boundary of said member substantially equals the extent of the outer boundary of the base of the body of the basket.

5. A basket according to claim 1 wherein said releasable means comprises projecting pin means and a plate apertured to receive said pin means.

6. A basket according to claim 5 wherein the plate is attached to a link pivotally mounted on the body of the basket.

References Cited

UNITED STATES PATENTS

| | | | |
|---|---|---|---|
| 3,524,005 | 8/1970 | Scott | 294—71 X |
| 2,993,724 | 7/1961 | Pakulla | 294—69 |
| 2,626,828 | 1/1953 | Morgan | 294—69 |

FOREIGN PATENTS

| | | | |
|---|---|---|---|
| 344,691 | 12/1919 | Germany | 222—502 |

ROBERT B. REEVES, Primary Examiner

L. MARTIN, Assistant Examiner

U.S. Cl. X.R.

222—503, 556